(12) United States Patent
Banerjee

(10) Patent No.: US 8,578,442 B1
(45) Date of Patent: Nov. 5, 2013

(54) ENFORCING CONSISTENT ENTERPRISE AND CLOUD SECURITY PROFILES

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 189 days.

(21) Appl. No.: 13/046,664

(22) Filed: Mar. 11, 2011

(51) Int. Cl.
*H04L 29/06* (2006.01)

(52) U.S. Cl.
USPC ............................................ 726/1; 709/204

(58) Field of Classification Search
None
See application file for complete search history.

(56) References Cited

U.S. PATENT DOCUMENTS

| | | | |
|---|---|---|---|
| 2009/0249440 A1* | 10/2009 | Platt et al. .......................... | 726/1 |
| 2011/0251992 A1* | 10/2011 | Bethlehem et al. ........... | 707/610 |
| 2012/0066670 A1* | 3/2012 | McCarthy et al. ............ | 717/169 |
| 2012/0159572 A1* | 6/2012 | Patel et al. ........................ | 726/3 |

OTHER PUBLICATIONS

Barrett, L., "McAfee Serves Up Cloud Security Suite," internet.com, QuinStreet Inc., Jun. 29, 2010, 3 pages, [Online] [Retrieved on Jul. 13, 2011] Retrieved from the Internet<URL:http://www.esecurityplanet.com/features/article.php/3890436/McAfee-Serves-Up-Cloud-S . . . >.

Rane, P., "Enterprise Applications in the Cloud: A SaaS Security Perspective," ESJ.com, Feb. 9, 2010, 3 pages, [Online] [Retrieved on Jul. 13, 2011] Retrieved from the Internet<URL:http://esj.com/Articles/2010/02/09/Cloud-SaaS-Security.aspx?p=1>.

"Shalom: Cloud Insider Risk Security Platform", Official White Paper, Nowell Development, Inc., Jun. 2011, 19 pages.

Wang, C. et al., "Ensuring Data Storage Security in Cloud Computing," 17$^{th}$ International Workshop on Quality of Service, Jul. 13-15, 2009, 9 pages.

* cited by examiner

*Primary Examiner* — Hadi Armouche
(74) *Attorney, Agent, or Firm* — Fenwick & West LLP

(57) ABSTRACT

Consistent enterprise and cloud security profiles are enforced. A domain model describing cloud resource objects associated with an enterprise is defined. Further, a relationship map describing relationships between the objects of the domain model and roles of enterprise users described by local security profiles maintained by the enterprise is specified. The domain model and relationship map collectively form an access policy for the cloud resource objects. Network traffic is monitored to detect network traffic attempting to configure a cloud security profile describing permissions of an enterprise user with respect to cloud resource objects in a manner inconsistent with the access policy. Detected network traffic attempting to configure the cloud security profile in the manner inconsistent with access policy is remediated.

20 Claims, 4 Drawing Sheets

ENFORCING CONSISTENT ENTERPRISE AND CLOUD SECURITY PROFILES

BACKGROUND

1. Field of Art

The present invention generally relates to the field of computer security and in particular to monitoring permissions to resources in cloud-based computing environments to ensure consistency with enterprise policies.

2. Background of the Invention

An enterprise typically stores a large amount of resources including data and applications. Some of the resources are usually stored locally at data centers on the premises of the enterprise, while other resources are stored remotely by cloud-based service providers. Users at the enterprise access the cloud-based resources via the Internet or another network.

Administrators at the enterprise manage permissions of the users with respect to the resources. For locally-stored resources, the administrators can directly manage permissions by assigning users to roles and separately mapping roles to permissions on the local resources. The permissions can include read, write, and modify permissions.

Managing permissions of users with respect to cloud-based resources is more difficult. The cloud service providers may provide tools allowing administrators to configure permissions of users with respect to resources stored in the cloud. However, often the relationships between the cloud resources and roles of the enterprise users are not apparent. As a result, it is difficult for administrators to verify whether cloud-based permissions for the enterprise users are consistent with their assigned roles.

In addition, the administrators might not detect if the cloud-based permission of a user deviate from the permissions granted by the user's roles in the enterprise. For example, the administrators might not detect if an administrator's account in the cloud is compromised and used to maliciously modify permissions of other users. Additionally, a legitimate administrator might not notice if a malicious administrator improperly escalates permissions of a user.

SUMMARY

The above and other issues are addressed by a computer-implemented method, non-transitory computer readable storage medium, and computer system for enforcing consistent enterprise and cloud security profiles. An embodiment of the method comprises defining a domain model describing cloud resource objects associated with an enterprise and specifying a relationship map describing relationships between the objects of the domain model and roles of enterprise users described by local security profiles maintained by the enterprise. The domain model and relationship map collectively form an access policy for the cloud resource objects. The method further comprises monitoring network traffic to detect network traffic attempting to configure a cloud security profile describing permissions of an enterprise user with respect to cloud resource objects in a manner inconsistent with the access policy. The method also comprises remediating detected network traffic attempting to configure the cloud security profile in the manner inconsistent with the access policy.

An embodiment of the non-transitory computer-readable storage medium stores executable computer program instructions for enforcing consistent enterprise and cloud security profiles, the instructions executable to perform steps comprising defining a domain model describing cloud resource objects associated with an enterprise and specifying a relationship map describing relationships between the objects of the domain model and roles of enterprise users described by local security profiles maintained by the enterprise. The domain model and relationship map collectively form an access policy for the cloud resource objects. The steps additionally comprise monitoring network traffic to detect network traffic attempting to configure a cloud security profile describing permissions of an enterprise user with respect to cloud resource objects in a manner inconsistent with the access policy and remediating detected network traffic attempting to configure the cloud security profile in the manner inconsistent with the access policy.

An embodiment of the computer system for enforcing consistent enterprise and cloud security profiles comprises a non-transitory computer-readable storage medium storing executable computer program instructions comprising instructions for defining a domain model describing cloud resource objects associated with an enterprise and specifying a relationship map describing relationships between the objects of the domain model and roles of enterprise users described by local security profiles maintained by the enterprise. The domain model and relationship map collectively form an access policy for the cloud resource objects. The instructions are further for monitoring network traffic to detect network traffic attempting to configure a cloud security profile describing permissions of an enterprise user with respect to cloud resource objects in a manner inconsistent with the access policy and remediating detected network traffic attempting to configure the cloud security profile in the manner inconsistent with the access policy. The computer system further comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
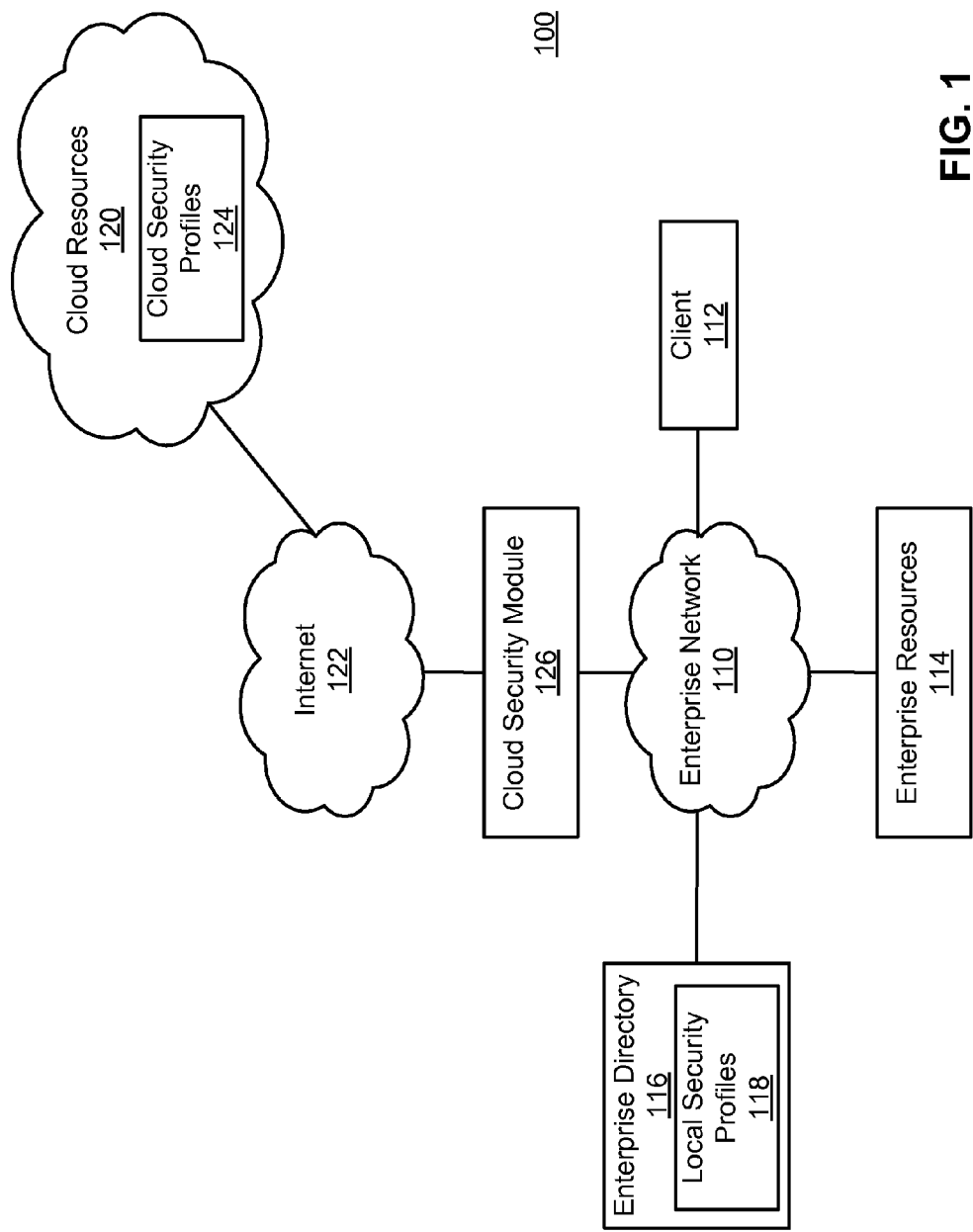
FIG. 1 is a high-level block diagram illustrating an environment for enforcing consistency between enterprise and cloud security profiles according to one embodiment.

FIG. 1 is a high-level block diagram illustrating an environment 100 for enforcing consistency between enterprise and cloud security profiles according to one embodiment. FIG. 1 illustrates an enterprise network 110 connected to the Internet 122. The enterprise network 110 is maintained by an enterprise, such as a business, school, or government agency in order to provide connectivity to various computers and other electronic devices supported by the enterprise. Although not shown in FIG. 1, a firewall may be located between the enterprise network 110 and Internet 122 to protect the enterprise network 110.

The enterprise network 110 and Internet 122 represent communication pathways between entities connected to these networks. In one embodiment, these networks 110, 122 use standard communications technologies and/or protocols. Thus, the networks 110, 122 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the networks 110, 122 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the networks 110, 122 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), HTTP Secure (HTTPS), virtual private networks (VPNs), Internet Protocol security (IPsec), etc. In another embodiment, the entities on the networks 110, 122 use custom and/or dedicated data communications technologies instead of, or in addition to, the ones described above.

An enterprise client 112 is connected to the enterprise network 110. The client 112 is a computer or other electronic device used by one or more users (including administrators) to execute applications for performing various activities associated with the enterprise. For example, the client 112 can be a desktop, notebook, or tablet computer, a mobile telephone, or television set-top box. The applications executed by the client 112 may include web browsers, word processors, spreadsheets, etc. In one embodiment, a user uses the client 112 to access resources stored locally by the enterprise and resources stored remotely outside of the enterprise (i.e., "in the cloud"). These resources can include applications, data, workflows, data feeds, and presentation elements. Although only one client 112 is shown in FIG. 1 for clarity, enterprises can include many clients. In addition, this description also uses the term "client" to refer to a device used by an user to access the enterprise's cloud resources from outside of the enterprise network 110.

Enterprise resources 114 are also connected to the enterprise network 110. The enterprise resources 114 represent the local resources, e.g., applications and data, that can be accessed by users of the clients 112. In one embodiment, the enterprise resources 114 are hosted at one or more data centers maintained by the enterprise. Hence, the enterprise resources 114 are referred to as "local" or "on-premises" resources.

An enterprise directory 116 provides directory services for the enterprise. The directory services provide a central location for administration of the enterprise network 110. In one embodiment, the enterprise directory 116 maintains information about each entity that uses the enterprise network 110, such as clients 112, users, and applications. The enterprise directory 116 is maintained by one or more administrators of the enterprise network 110. An embodiment of the enterprise directory 116 supports the Lightweight Directory Access Protocol (LDAP) to allow other entities on the enterprise network 110 to query the directory for information.

The enterprise directory 116 maintains a set of local security profiles 118 for the enterprise users. A user's local security profile 118 describes information about that user, such as authentication credentials describing user names and passwords used by the user and permissions information describing the permissions of the user with respect to the enterprise's local resources 114. In one embodiment, the security profile describes the user's permissions by specifying one or more roles assigned to the user. For example, the user may be assigned a role of "salesperson," "West Coast salesperson," "Financial Analyst," "IT Support," etc.

The enterprise directory 116 maintains information specifying the roles granted to each enterprise user. The permissions embodied in the roles describe the local enterprise resources 114 that each role can access. The permissions can also describe the types of access permitted by the role, e.g., whether the role can read, write, and/or modify the resources 114. For example, the permissions information may specify that a user having the role of "salesperson" can access certain types of sales data stored within the enterprise resources 114. When a user logs into a client 112, the user's local security profile 118 is provided to the client 112 and the user is given the permissions assigned to the user's roles.

FIG. 1 also illustrates cloud resources 120 connected to the enterprise network 110 via the Internet 122 Like the enterprise resources 114, the cloud resources 120 include applications and data that can be accessed by users of the enterprise clients 112. In one embodiment, the cloud resources 120 are provided by a Software-as-a-Service (SaaS) provider, such as SALESFORCE.COM. While only one instance of cloud resources 120 is shown in FIG. 1, embodiments can have multiple instances of cloud resources connected to the enterprise network 110 via the Internet 122. The cloud resource instances can be provided by the same, or different SaaS providers.

The cloud resources 120 may include a mix of data uploaded by the enterprise and applications that operate on the data provided by the SaaS provider. In one embodiment, the cloud resources 120 are logically organized as a set of objects, called "cloud resource objects" or "cloud objects." For example, the cloud objects can include data objects, application objects, workflow objects, feed objects, and presentation objects. A data object, in turn, can represent a set of data, such as West Coast sales data for the enterprise. In one embodiment, the SaaS provider provides an object model that allows an enterprise to specify cloud objects with a high level of granularity.

The cloud resources 120 also include a set of cloud security profiles 124 for the enterprise users. A user's cloud security profile 124 describes information about that user, including authentication credentials and permissions information with respect to the cloud resources 120. The cloud security profile 124 can specify the user's permissions with respect to individual cloud objects, including whether the user can read, write, modify, or execute the objects. The cloud security profiles 124 of enterprise users should provide the users with permissions commensurate with the users' roles at the enterprise. If a user's cloud security profile 124 granted permissions that exceeded the permissions granted by the user's roles, the permissions would represent a security risk because the user could access cloud resource objects that the user is not entitled to access.

A cloud security module 126 ensures that the enterprise users' cloud security profiles 124 conform to permissions consistent with the users' local security profiles 118. The cloud security module 126 configures users' cloud security profiles 124 to grant the users only permissions consistent with the users' roles at the enterprise. The cloud security module 126 also detects and remediates any network traffic attempting to configure (e.g., create or change) the cloud security profiles 124 in a manner inconsistent with the local security profiles 118. Thus, the cloud security module 1126 provides security to the enterprise by preventing unauthorized access to the cloud resources 120.

The network location of the cloud security module 126 can vary in different embodiments. In one embodiment, the cloud security module 126 executes on a proxy server connected to the enterprise network 110. All traffic from the enterprise network 110 destined for the cloud resources 120 passes through the cloud security module 126. This embodiment is often used when the cloud resources 120 are accessed from only clients 112 within the enterprise network 110.

In another embodiment, the cloud security module 126 executes as a reverse proxy on a server associated with the cloud resources 120 or connected elsewhere on the Internet 122. The reverse proxy uses domain name system (DNS)-based or other techniques to force all accesses to the enterprise's cloud resources 120 to pass through the security module 126, regardless of whether the accesses originate from within the enterprise network 110. This embodiment is often used when the cloud resources 120 are accessed using clients located both inside and outside of the enterprise network 110.

Figure 2:
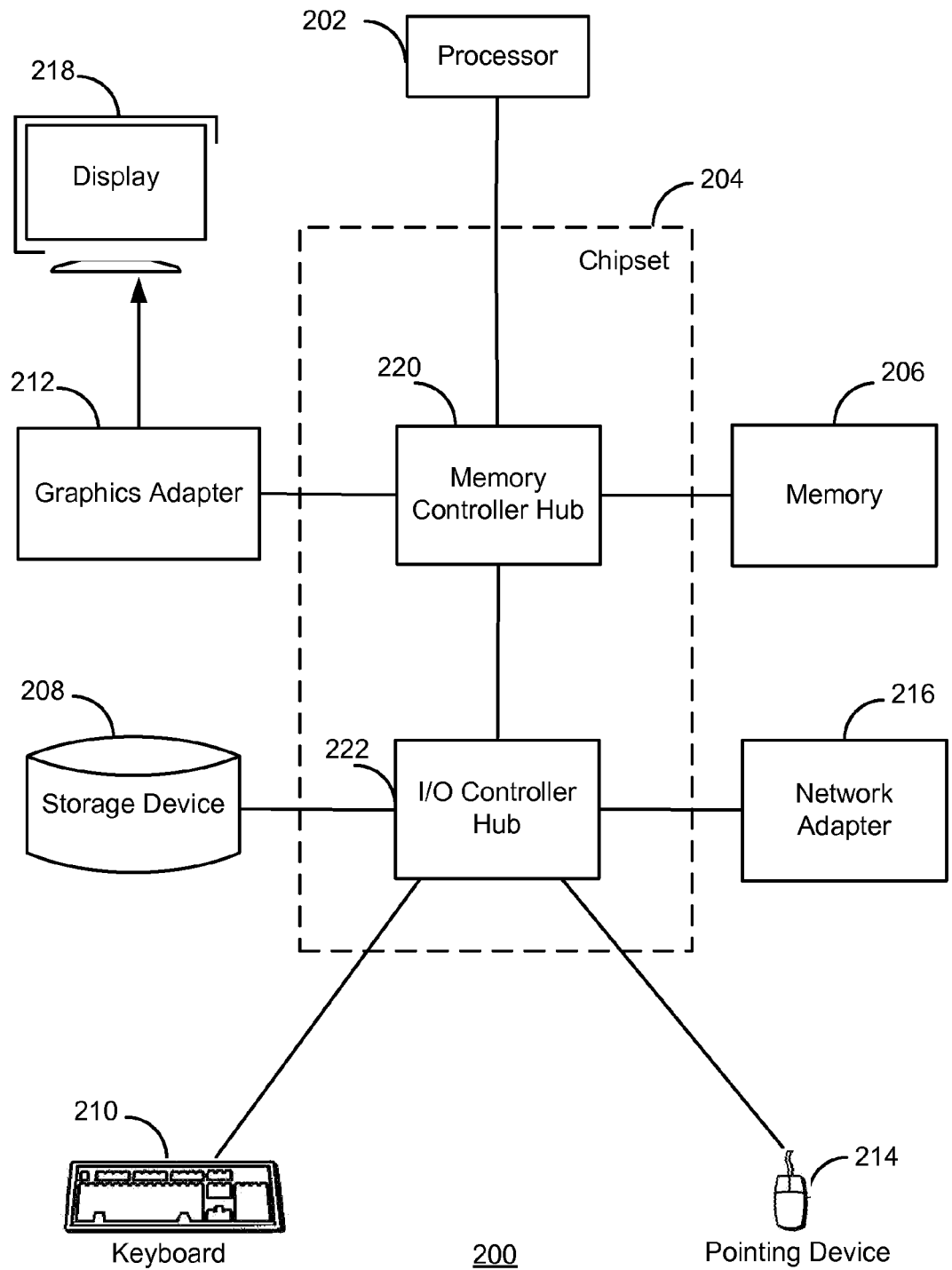
FIG. 2 is a high-level block diagram illustrating an example of a computer for use as a client and/or to implement the other entities described in FIG. 1.

FIG. 2 is a high-level block diagram illustrating an example of a computer 200 for use as a client 112 and/or to implement the other entities described in FIG. 1. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the enterprise network 110 and/or Internet 122. Some embodiments of the computer 200 have different and/or other components than those shown in FIG. 2. For example, a server implementing the enterprise directory 116 or cloud resources can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
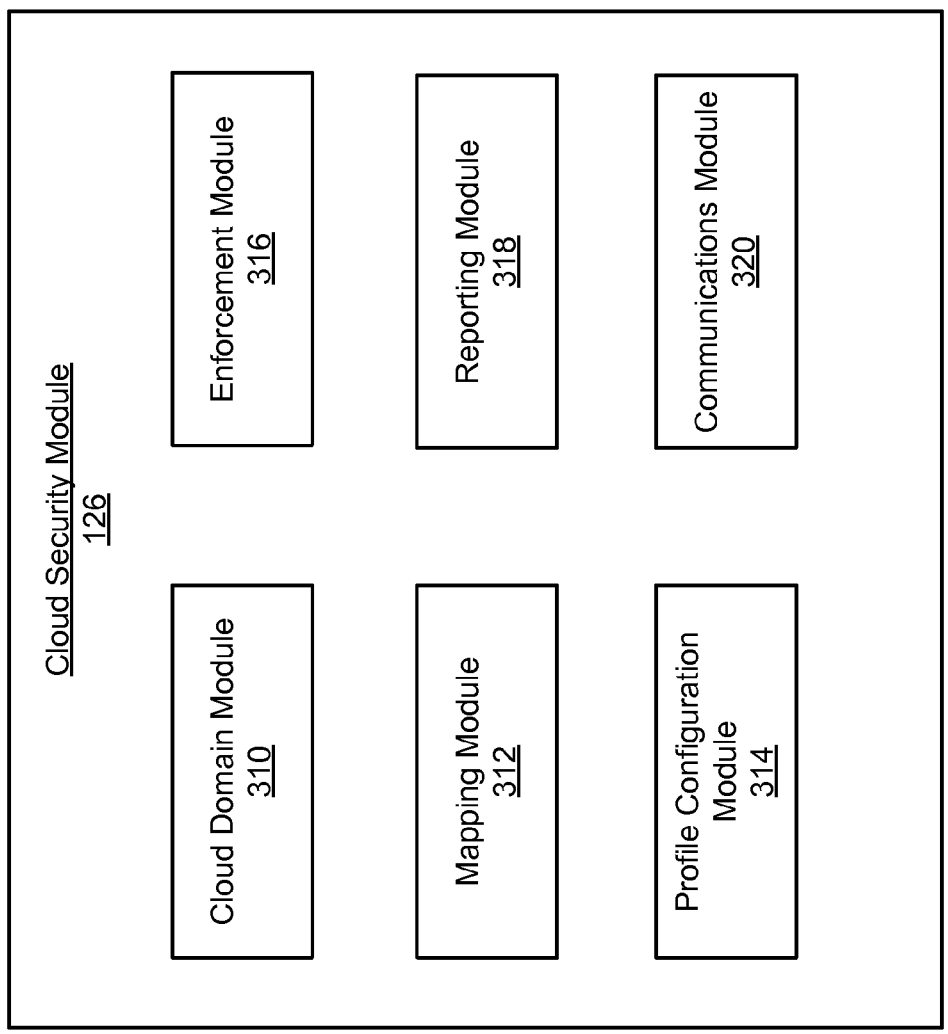
FIG. 3 is a high-level block diagram illustrating a detailed view of the cloud security module according to one embodiment.

FIG. 3 is a high-level block diagram illustrating a detailed view of the cloud security module 126 according to one embodiment. As shown in FIG. 3, the cloud security module 126 itself includes multiple modules. In some embodiments, the functions are distributed among the modules in a different manner than described herein. In addition, some embodiments include different and/or other modules.

A cloud domain module 310 describes cloud resource objects associated with the enterprise and relationships among the objects. The cloud resource objects include data, application, and presentation element objects. For example, a domain model can include a cloud resource data object describing West Coast sales activity for the enterprise and a cloud resource data object describing East Coast sales activity. Other types of cloud resource objects can be described in the same fashion. The domain model can also specify hierarchical relationships among the objects. For example, the domain model can specify that the East Coast sales data and West Coast sales data are children of a "sales data" object.

In one embodiment, the cloud domain module 310 provides an enterprise administrator with an interface enabling the administrator to define the domain model. For example, the cloud domain module 310 can provide a web-based interface that the administrator uses to discover objects at the cloud resources 120 provided by the SaaS provider and describe relationships among the objects. The cloud domain module 310 thus receives the domain model from the administrator. The cloud domain module 310 and the other modules within the cloud security module 126 can use the administrator's or another's credentials to access the cloud resources 120 in order to identify the set of cloud resource objects available for description and/or for other purposes.

A mapping module 312 specifies a relationship map describing relationships between the cloud domain model and the roles of the users described by the local security profiles 118 in the enterprise directory 116. In one embodiment, the mapping module 312 accesses the enterprise directory 116 to obtain the local security profiles 118, and identifies the set of all roles assigned to enterprise users. The mapping module 312 creates a relationship map that associates the individual roles with permissions with respect to the objects in the cloud domain model. For example, the relationship map can specify that enterprise users having the "salesperson" role can read, write and modify certain cloud objects related to sales data but cannot read or otherwise access cloud objects unrelated to sales data.

As with the cloud domain module 310, an embodiment of the mapping module 312 provides an enterprise administrator with an interface enabling the administrator to define the relationship map. Thus, the administrator can specify the relationships between roles and objects. The administrator can also specify the permission of the roles with respect to the objects. The mapping module 312 thus receives the relationship and role specifications from the administrator.

The domain model and relationship map collectively form an access policy for the cloud resource objects. The relationship map describes the objects that the users having specified roles can access, and the permissions of the users with respect to the objects. The domain model, in turn, describes the cloud resource objects used by the enterprise. Thus, the access policy describes the permissions of the enterprise users with respect to the cloud resource objects.

A profile configuration module 314 configures the enterprise users' cloud security profiles 124 to conform with the access policy. In other words, the profile configuration module 314 configures the cloud security profiles 124 to allow enterprise users to access only the cloud resources 120 permitted according to the users' assigned roles in the local security profiles 118. For example, if a user's local security profile 118 in the enterprise directory 116 assigns the user the "salesperson" role, and the relationship map indicates that the salesperson role can access the "sales data" objects, the profile configuration module 314 configures that user's cloud security profile 124 to give the user access to those cloud resource objects with the same permissions specified by the local profile 118. The profile configuration module 314 can be set to configure the cloud security profiles at various times, such as on request, on a periodic schedule, when the domain model or relationship map is updated, when the local profiles 118 are modified, and/or at other times.

An enforcement module 316 inspects network traffic sent from the clients 112 to the cloud resources 120 to ensure that the users' cloud security profiles 124 are consistent with the access policy. In one embodiment, the enforcement module 316 detects any network traffic including operations attempting to change the configuration of a cloud security profile 124. Hence, the enforcement module 316 can detect network traffic that creates a cloud security profile 124 for a new user and traffic that alters the permissions of a user with respect to an object in the cloud domain model.

Upon detecting such network traffic, the enforcement module 316 determines whether the attempted change to the cloud security profile 124 results in a configuration of the cloud profile that is consistent with the access policy. If the change is consistent with the policy, the enforcement module 316 allows the traffic to pass to the cloud resources 120. If the change is inconsistent with the access policy, the enforcement module 316 remediates the change by, e.g., blocking the traffic to prevent the change to the cloud security profile 124 or querying the enterprise administrator as to whether to allow the change. In one embodiment, the actions of the enforcement module 316 are controlled by an enforcement policy that specifies remediation actions to perform. The actions can be dependent, e.g., on the type of change attempted and/or how the attempted change violates the access policy.

A reporting module 318 generates reports describing the operation of the cloud reporting module 126. The reports can include logs of actions performed, types of traffic detected, remediation actions performed in response to the network traffic, etc. In addition, the reports can include sending message to the administrator or another person if the cloud security module 126 performs certain actions. For example, the reporting module 318 can send an alert to the administrator if an attempt to make a change inconsistent with the access policy is detected. In one embodiment, the reporting module 318 performs actions specified by the enforcement policy.

A communications module 320 supports communications between the clients 112 and the cloud resources 120. In one embodiment, the communications module 320 intercepts outbound network traffic sent by the clients 112 to the cloud resources 120 and provides the traffic to the other modules within the cloud security module 126. The communication module 320 selectively transmits the network traffic to the cloud resources 120 depending upon the access and enforcement policies.

In some embodiments, the network traffic between the clients 112 and cloud resources 120 is encrypted using HTTPS or another technique. In order to transparently support encryption, the communications module 320 acts as a "man-in-the-middle" and makes independent network connections with the clients 112 and the cloud resources 120. The communications module 320 supports encryption by impersonating the cloud resources 120 when interacting with the clients 112 and impersonating the clients when interacting with the cloud resources. Thus, the communication links are encrypted and the cloud security module 126 is transparent to the clients 112 and cloud services 120.

Figure 4:
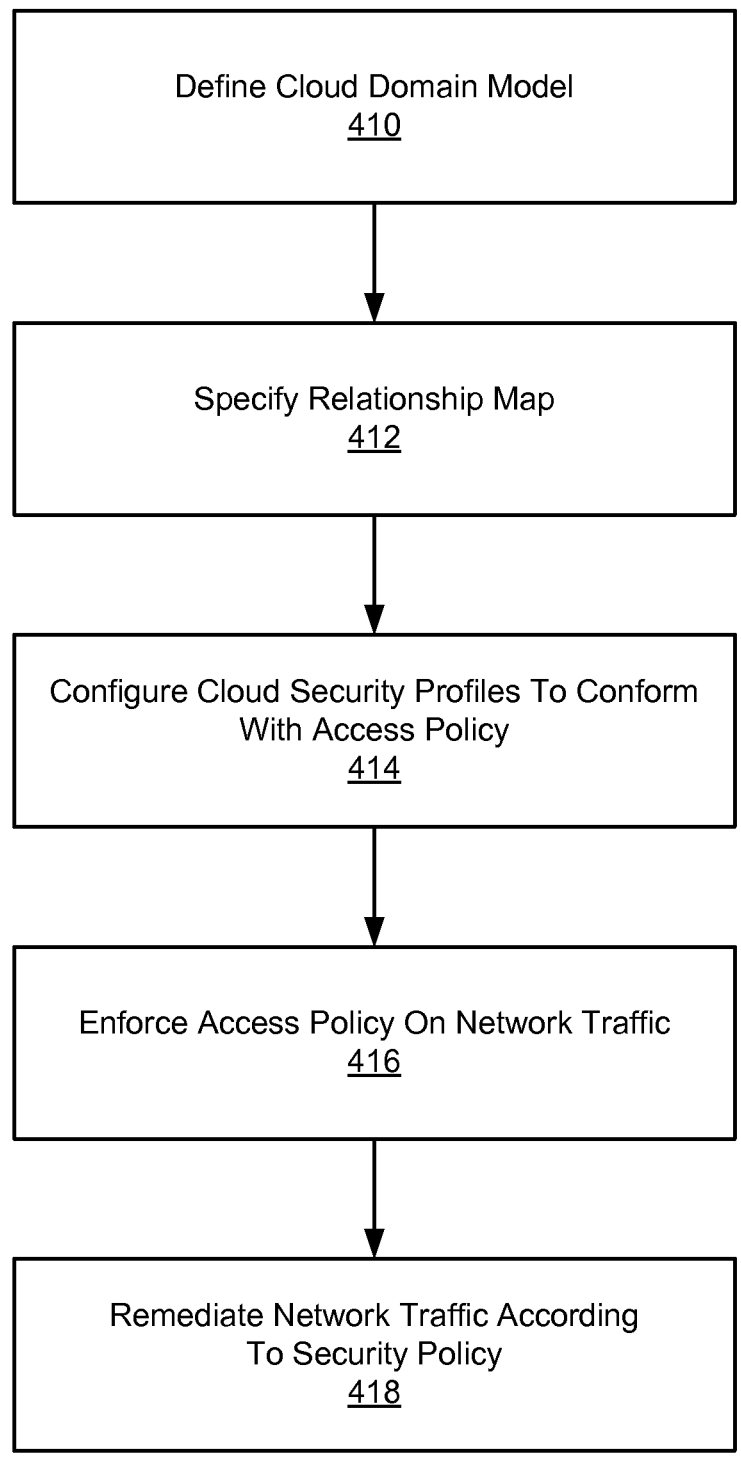
FIG. 4 is a flowchart illustrating a method of monitoring network traffic exchanged between clients and the cloud resources to ensure that the enterprise users' cloud security profiles conform to permissions consistent with the users' local security profiles according to one embodiment.

FIG. 4 is a flowchart illustrating a method of ensuring that the enterprise users' cloud security profiles 124 conform to permissions consistent with the users' local security profiles 118 according to one embodiment. Other embodiments can perform the steps in different orders and can include different and/or additional steps. In addition, some or all of the steps can be performed by entities other than the cloud security module 126.

The cloud security module 126 defines 410 a cloud domain model. This model describes the types of cloud resource objects. In addition, the cloud security module 126 specifies 412 a relationship map describing relationships between the model and the roles of the users described by local security profiles 118 in the enterprise directory 116. The relationship map indicates the permissions of the roles with respect to the objects in the domain model. Together the domain model and relationship map form an access policy that describes the permissions of the enterprise users with respect to the cloud resource objects.

The cloud security module configures 414 the users' cloud security profiles 124 to conform with the access policy. In addition, the cloud security module 126 enforces 416 the access policy on network traffic sent between the clients 112 and the cloud resources 120. The cloud security module 126 remediates 418 network traffic that attempts to make a cloud security profile 124 inconsistent with the access policy by, e.g., blocking the traffic or querying an administrator regarding whether to allow the change.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of enforcing consistent enterprise and cloud security profiles comprising:
   defining a domain model describing cloud resource objects associated with an enterprise, wherein the cloud security profiles associated with enterprise users describe permissions of the users with respect to the objects;
   specifying a relationship map mapping permissions for objects of the domain model to one or more roles of enterprise users, wherein local security profiles maintained by the enterprise associate users with one or more roles, the domain model and relationship map collectively forming an access policy for the cloud resource objects;
   monitoring network traffic to detect an attempt to configure a cloud security profile associated with a user in a manner inconsistent with the access policy; and
   remediating a detected attempt to configure the cloud security profile in the manner inconsistent with the access policy.

2. The method of claim 1, wherein defining the domain model comprises:
   identifying cloud resource objects provided to the enterprise by a Software-as-a-Service (SaaS) provider; and
   establishing relationships among the cloud resource objects.

3. The method of claim 1, wherein specifying the relationship map comprises:
 identifying roles assigned to the enterprise users by the local security profiles;
 associating the roles assigned to the enterprise users with objects in the domain model; and
 specifying permissions of the roles with respect to the objects with which the roles are associated.

4. The method of claim 1, wherein the access policy describes permissions of enterprise users with respect to the cloud resource objects.

5. The method of claim 4, further comprising:
 configuring a plurality of cloud security profiles to conform with the access policy.

6. The method of claim 1, wherein monitoring network traffic comprises:
 inspecting network traffic to detect an attempt to alter the cloud security profile; and
 determining whether the attempted alteration of the cloud security profile is consistent with the access policy.

7. The method of claim 1, wherein remediating the detected attempt comprises blocking the attempt.

8. A non-transitory computer-readable storage medium storing executable computer program instructions for enforcing consistent enterprise and cloud security profiles, the instructions executable to perform steps comprising:
 defining a domain model describing cloud resource objects associated with an enterprise, wherein the cloud security profiles associated with enterprise users describe permissions of the users with respect to the objects;
 specifying a relationship map mapping permissions for objects of the domain model to one or more roles of enterprise users, wherein local security profiles maintained by the enterprise associate users with one or more roles, the domain model and relationship map collectively forming an access policy for the cloud resource objects;
 monitoring network traffic to detect an attempt to configure a cloud security profile associated with a user in a manner inconsistent with the access policy; and
 remediating a detected attempt to configure the cloud security profile in the manner inconsistent with the access policy.

9. The computer-readable storage medium of claim 8, wherein defining the domain model comprises:
 identifying cloud resource objects provided to the enterprise by a Software-as-a-Service (SaaS) provider; and
 establishing relationships among the cloud resource objects.

10. The computer-readable storage medium of claim 8, wherein specifying the relationship map comprises:
 identifying roles assigned to the enterprise users by the local security profiles;
 associating the roles assigned to the enterprise users with objects in the domain model; and
 specifying permissions of the roles with respect to the objects with which the roles are associated.

11. The computer-readable storage medium of claim 8, wherein the access policy describes permissions of enterprise users with respect to the cloud resource objects.

12. The computer-readable storage medium of claim 11, the steps further comprising:
 configuring a plurality of cloud security profiles to conform with the access policy.

13. The computer-readable storage medium of claim 8, wherein monitoring network traffic comprises:
 inspecting network traffic to detect an attempt to alter the cloud security profile; and
 determining whether the attempted alteration of the cloud security profile is consistent with the access policy.

14. The computer-readable storage medium of claim 8, wherein remediating the detected attempt comprises blocking the attempt.

15. A computer system for enforcing consistent enterprise and cloud security profiles, comprising:
 a non-transitory computer-readable storage medium storing executable computer program instructions comprising instructions for:
  defining a domain model describing cloud resource objects associated with an enterprise, wherein the cloud security profiles associated with enterprise users describe permissions of the users with respect to the objects;
  specifying a relationship map mapping permissions for objects of the domain model to one or more roles of enterprise users, wherein local security profiles maintained by the enterprise associate users with one or more roles, the domain model and relationship map collectively forming an access policy for the cloud resource objects;
  monitoring network traffic to detect an attempt to configure a cloud security profile associated with a user in a manner inconsistent with the access policy; and
  remediating a detected attempt to configure the cloud security profile in the manner inconsistent with the access policy; and
 a processor for executing the computer program instructions.

16. The computer system of claim 15, wherein defining the domain model comprises:
 identifying cloud resource objects provided to the enterprise by a Software-as-a-Service (SaaS) provider; and
 establishing relationships among the cloud resource objects.

17. The computer system of claim 15, wherein specifying the relationship map comprises:
 identifying roles assigned to the enterprise users by the local security profiles;
 associating the roles assigned to the enterprise users with objects in the domain model; and
 specifying permissions of the roles with respect to the objects with which the roles are associated.

18. The computer system of claim 15, wherein the access policy describes permissions of enterprise users with respect to the cloud resource objects.

19. The computer system of claim 18, the steps further comprising:
 configuring a plurality of cloud security profiles to conform with the access policy.

20. The computer system of claim 15, wherein monitoring network traffic comprises:
 inspecting network traffic to detect an attempt to alter the cloud security profile; and
 determining whether the attempted alteration of the cloud security profile is consistent with the access policy.

* * * * *